(No Model.)

C. HEATON.
TOOL HANDLE.

No. 290,581.  Patented Dec. 18, 1883.

Witnesses.
Louis F. Gardner
J. W. Garner

Inventor.
Chas. Heaton,
per
F. A. Lehmann,
Atty.

UNITED STATES PATENT OFFICE.

CHARLES HEATON, OF GUILFORD, NEW YORK.

TOOL-HANDLE.

SPECIFICATION forming part of Letters Patent No. 290,581, dated December 18, 1883.

Application filed October 23, 1883. (No model.)

*To all whom it may concern:*

Be it known that I, CHARLES HEATON, of Guilford, in the county of Chenango and State of New York, have invented certain new and useful Improvements in Adjustable Handles; and I do hereby declare the following to be a full, clear, and exact description of the invention, such as will enable others skilled in the art to which it pertains to make and use it, reference being had to the accompanying drawings, which form part of this specification.

My invention relates to an improvement in adjustable handles which are especially adapted to be used upon blocks made of emery, but which are adapted to be applied to other implements as well; and it consists, first, in a handle which is made of two separate and distinct parts, each of which has a flange at its lower end to catch over the block or other tool, and suitable bearing-points for bracing the handle rigidly in an upright position, and a clamping bolt or screw, which is passed through their lower ends to hold them together; second, in a handle which is formed of two separate and distinct parts, each of which has a flange at its lower end to catch over the block or other tool, and one of which parts has a dowel-pin at its upper end, and the other a corresponding recess to receive the dowel-pin to hold the two parts securely together, in combination with a clamping-bolt which is passed through the lower ends of the two parts of the handle for clamping them upon the block or other tool, all of which will be more fully described hereinafter.

The object of my invention is to provide a handle which is adapted to be secured to blocks of emery and other similar devices of different widths, and which handle can be readily removed and replaced or adjusted into a new position, as may be desired.

Figure 1:
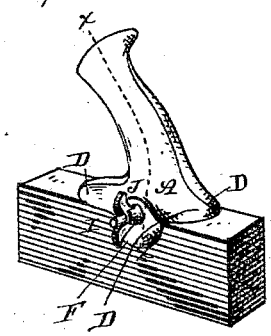
Figure 2:
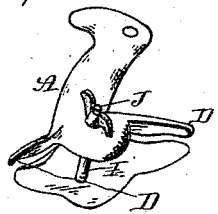
Figure 3:
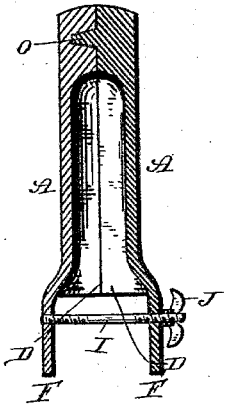

Figure 1 represents a perspective of a handle embodying my invention attached to a block of emery. Fig. 2 is a perspective of the handle by itself. Fig. 3 is a section on the line *x x* of Fig. 1.

The handle is composed of two separate and distinct parts, A, which are applied together, as shown, and which form a handle either of the shape here shown or any other that may be preferred. The inner sides or edges of each part are made to fit snugly together, and each part A has suitable projecting flanges or bearing-points, D, which catch upon the top of the tool and brace the handle rigidly in position, so that it can have no play of any kind while in use.

Projecting from the lower outer edge of each part A is a clamping-flange, F, which will be of any width desired, and which is intended to catch over the outer edges of the block or tool, as shown, and secure the two parts of the handle to the tool by frictional contact.

Passed through both parts of the handle, just above the top of the tool to which the handle is to be applied, is a suitable clamping bolt or screw, I, to one end of which is applied the thumb-screw J, as shown. After the two parts of the handle have been applied to the block, this thumb-screw is turned until it tightens the two parts together in such a manner that the block or tool is rigidly held between them.

In order to prevent any movement of the upper ends of the two parts of the handle, a dowel-pin, O, is formed upon the inner side of one of them, and a corresponding recess or cavity is formed in the inner side of the other to receive this pin. This pin serves to keep the two parts accurately in line with each othother, and prevents any play of either part. This pin will be long enough to allow the handles to be slightly separated from each other, and yet hold them in such a manner that they can have no play.

Having thus described my invention, I claim—

1. A handle for tools, composed of two duplicate parts, each one of which has a flange to catch over the side of the tool, and suitable bearing-points which rest upon the top of the tool and brace the handle in an upright position, in combination with a clamping device for securing the two parts of the tool together, substantially as shown.

2. In a handle for tools which is composed of two parts, one of which is provided with a dowel-pin at its upper end and the other with a suitable recess to receive the pin, and each part provided with bearing points or flanges to catch upon the top of the tool, and a flange 5 upon its lower end to catch over the side of the tool, in combination with a clamping device for securing the two parts of the handle in position, substantially as specified.

In testimony whereof I affix my signature in presence of two witnesses.

CHAS. HEATON.

Witnesses:
 J. B. ROWLEY,
 N. D. BARTLE.